United States Patent [19]

Mills

[11] Patent Number: 4,739,561
[45] Date of Patent: Apr. 26, 1988

[54] DOOR LEVELING DEVICE

[76] Inventor: Norman J. Mills, 820 Aspen Rd., West Palm Beach, Fla. 33409

[21] Appl. No.: 39,702

[22] Filed: Apr. 20, 1987

[51] Int. Cl.⁴ ............................................... G01C 9/24
[52] U.S. Cl. ...................................... 33/370; 33/372
[58] Field of Search ................ 33/379, 370, 371, 372, 33/376, 347, 333, 383, 390, 340, 354, 342, 381, 365

[56] References Cited

U.S. PATENT DOCUMENTS

| | | | |
|---|---|---|---|
| 376,341 | 1/1988 | Panyard | 33/372 |
| 449,609 | 3/1891 | Green | 33/371 |
| 1,200,410 | 10/1916 | Chemrinsky | 33/370 |
| 1,605,520 | 11/1926 | Dodge | 33/377 UX |
| 1,618,237 | 2/1927 | Sturm | 33/371 |
| 2,803,062 | 8/1957 | Dutcher | 33/340 |
| 2,834,118 | 5/1958 | Jackson | 33/372 |
| 3,442,024 | 5/1969 | Don | 33/381 |
| 4,404,752 | 9/1983 | Hanna | 33/347 |

*Primary Examiner*—Harry N. Haroian
*Attorney, Agent, or Firm*—Victor F. Volk

[57] ABSTRACT

For leveling prehung door assemblies a device is described on which a level indicator is mounted on one flange of a channel member that can be snap fitted onto the door edge.

11 Claims, 1 Drawing Sheet

DOOR LEVELING DEVICE

BACKGROUND OF THE INVENTION

In current building construction practice it is usual to install prehung doors, which is the industry expression for door assemblies that are delivered to the building site as a single unit including a door, the door jamb, and stop, with the door factoryaffixed on its hinges. However such door assemblies still have to be installed level and this has presented a problem of a place to attach the level while leaving the carpenter's hands free for the work of installation. Prehung doors are supplied left- or right-swinging, as required and they are highly standardized to a 1⅜ inch (34.925 mm) door thickness for inside doors and a 1¾ inch (44.5 mm) door thickness for outside doors. There is a standard spacing between the door edge and the jamb and the door face and the stop that strictly limits the size of any objects that will be fit into these spaces during installation.

In a professional patentability search for the PTO files patents U.S. Pat. Nos. 991,446; 1,612,843; 2,171,616; 2,531,563; 2,915,273; 2,624,118; 3,123,918; 3,159,924; 3,826,013; and 4,501,057 were developed of which the following four seem to have the most relevance to the present invention:

Feldheim U.S. Pat. No. 2,531,563 describes a level holder which can be clamped to a table top or the top of a side wall but would be useless for attaching to the edge of a closed door since the level structure itself would come between the door and the jamb.

Anderson U.S. Pat. No. 2,624,118 describes a device for levelling the vertical edge of wallpaper, This also could not fit against the edge of a closed door and would be useless for my purpose.

Leiblein U.S. Pat. No. 3,159,924 has a level to attach to the side rail of a ladder. Leiblein's level indicator is positioned in a parallel plane to the rail (ladder edge) and could not be used for levelling my door.

Palomera U.S. Pat. No. 4,501,057 shows a level holder which, if used for my purpose would require the edge of the door to be brought up against the short width of his leg 24 with no extended contact against the plane to be measured. Neither would it provide any means for gripping my door.

SUMMARY

I have invented a new and useful device to level a prehung door assembly which is one that comprises a door, a jamb, and a stop. My device comprises a channel member that snugly fits the thickness of the door and itself comprises a web member and flange members approximately normal to the web member, along with at least one level indicator that is fixed against an outer surface of one of the flange members. Advantageously my level indicator will comprise two, oppositely facing bubble vials so that my device can be used to level either right- or left-swinging doors.

Advantageously, the flange member that is on the other side of the web to the flange member that bears the level indicator has a thickness that does not exceed about ⅛ inch (3.2 mm) so that it can fit between the door and the jamb. Advantageously, also, the web of my channel does not exceed about 1/16 inch (1.6 mm) so that it fits between the door and the stop.

My novel method of levelling prehung doors comprises the steps of fitting over the free edge of the door a channel member that comprises a web member, one flange member that comprises a level indicator said web member being free to fit between the free door edge and a jamb of the door; reading the indicator with the door closed; and adjusting the door to be level from edge to edge thereof.

DETAILED DESCRIPTION OF PREFERRED EMBODIMENT

Figure 1:
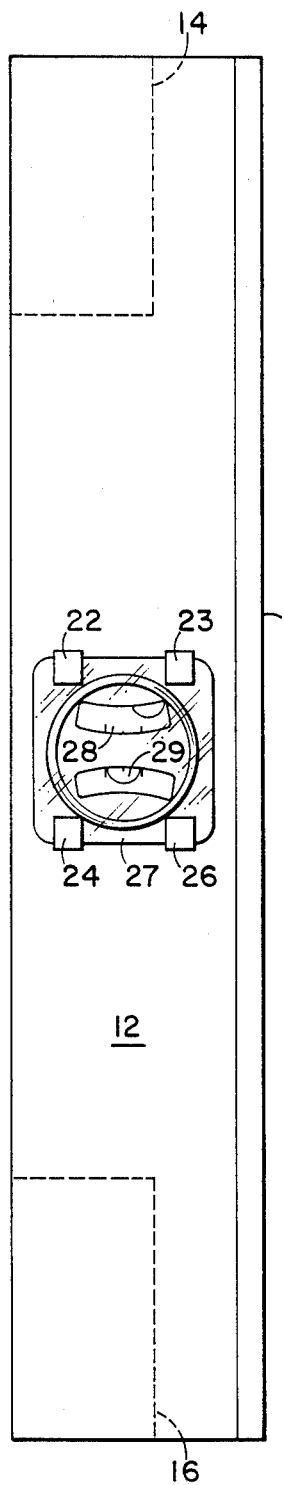
FIG. 1 shows a side view of the device of my invention.
Figure 2:
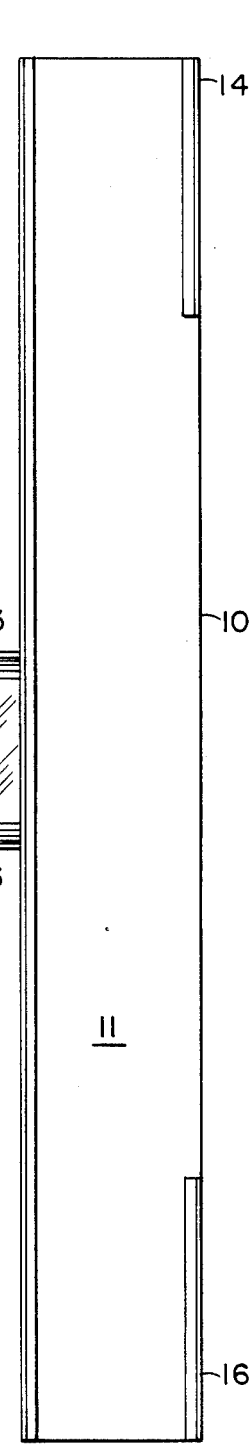
FIG. 2 shows a side view of the device of FIG. 1 turned 90 degrees.
Figure 3:
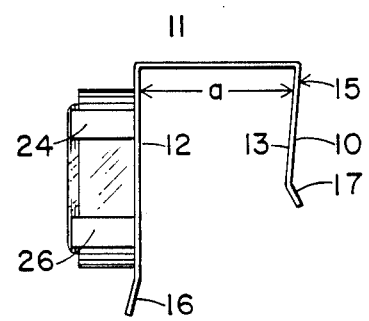
FIG. 3 shows an end view of the device of FIGS. 1 and 2.
Figure 4:
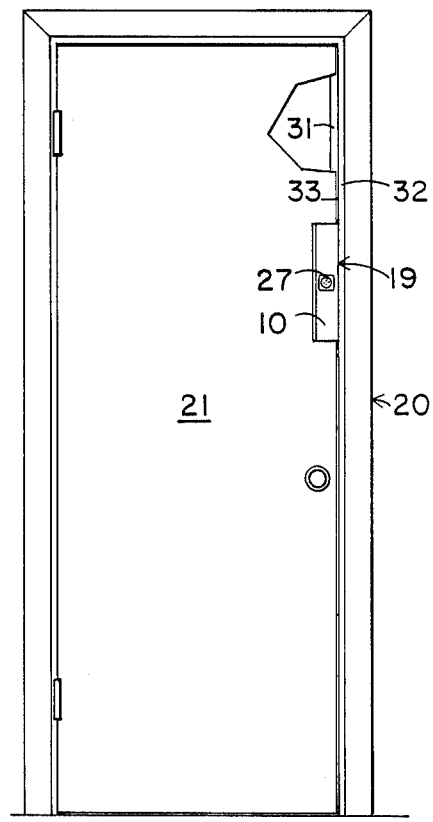
FIG. 4 shows an elevation of a door assembly (partly cut-away) with my device attached.

A preferred embodiment of my device is designated by the numeral 10 in FIGS. 1-4 as comprising a channel 15 with a web 11, and flanges 12 and 13. The central portion of the flange 13 has been cut away as being unnecessary to leave flange portions 14 and 16 at either end. The width of the web 11 and thus the spacing of the flanges 12, 13 is such that they will snap onto the width of a standard door so that the channel 15 will fit the door snugly and remain in position during installation. For this purpose my device 10 is preferably constructed of metal or synthetic polymer that has a spring temper with the flanges 13, 14 tapering together slightly from the web 11 as shown in FIG. 3. Respective edges 17, 18 of the flanges 12, 13 are flared outwardly, as shown to facilitate application of the channel 15 to an edge 19 of a door 21 (FIG. 4).

The flange 12 has four projecting tabs 22, 23, 24, 26 which securely hold a level indicator comprising a transparent case 27 holding two oppositely facing bubble vials 28, 29. In the position illustrated in FIG. 1 the vial 29 would be read to make a level determination while in the position of FIG. 4 it would be necessary to read the vial 28 which would then be undermost. Thus, by reversing my device end for end, and applying it to the right or left edge of a door, it can be used for either right-swinging or left-swinging doors. I have shown the tabs 22-26 as integral to the flange 12, being formed from strips cut from the flange metal. Other means of fastening the case 27 to the flange 12 may, however, be used within the scope of my invention and are well known in mechanical arts.

A significant advantage of my device resides in its simplicity and low cost and this is made possible partly by the fact that doors are made to standard thicknesses. Outside doors are standardized to be 1¾ inches (44.5 mm) and inside doors to be 1⅜ inches (34.935 mm) thick. The distance "a" between the flanges 12 and 13 is one of these two dimensions so that the device 10 will snap firmly onto the door when the door edge is fit flat against the inner surface of the web 11. In handling a prehung door assembly 20 during installation the whole assembly will be structurally firmer if the door is closed and this is possible with my device in place as shown in FIG. 4 because the thickness of the flange 13, in the area in which it makes contact, does not exceed the spacing between the door 21 and its stop 31, within the area of their contact, which spacing conforms to an industry standard of 1/16 inch (1.6 mm). It is possible also because my web 11 does not exceed the standard distance of ⅛-inch (3.2 mm) between an edge 19 of the door 21 and a jamb 33, within the area of their contact.

In using my device 10 the door 21 is swung open somewhat and the channel 15 is pressed over the open edge 19 until this edge is flat against the inside surface of the web 11 with the channel gripping the door. The channel is so applied that the flange 12 bearing the level indicator case 27 appears on the inside surface of the swinging door. If the hinges were on the opposite side of the door of FIG. 4 it would be necessary to turn the channel 15 end for end in applying it to the left edge of the door. The door assembly 20 is then set level by reference to the bubble vial 28. (If it were a left-swinging door, the vial 29 would be read.) During this installation a carpenter is not required to occupy a hand to hold the level but is assured that the level will remain firmly and accurately in place. Nor is any time needed for adjustment since the same level can be slide fitted quickly onto any inside (or outside) door.

I have invented a new and useful device of which the foregoing description has been exemplary rather than definitive and for which I desire an award of Letters Patent as defined in the appended claims.

I claim:

1. A device for levelling a prehung door assembly comprising a door, a jamb, and a stop, comprising:
   (A) a channel member snugly fitting the thickness of said door, said channel member comprising a web member and flange members approximately normal to said web member, said web member being sufficiently thin to fit between the edge of said door and said jamb said door being closed, and
   (B) at least one level indicator fixed to one of said flange members.

2. The device of claim 1 wherein said level indicator comprises two oppositely facing bubble vials whereby said device may be used to level either right- or left-swinging doors.

3. The device of claim 1 wherein said flange member on the other side of said web to said flange member bearing said level indicator has a thickness not exceeding about ⅛ inch (3.2 mm) thereby fitting between said door and said stop.

4. The device of claim 2 wherein said flange member on the other side of said web to said flange member bearing said level indicator has a thickness not exceeding about ⅛ inch (3.2 mm) thereby fitting between said door and said stop.

5. The device of claim 1 wherein said flange members are spaced 1⅜ inches (34.925 mm) apart thereby fitting standard inside doors.

6. The device of claim 1 wherein said flange members are spaced 1¾ inches (44.5 mm) apart thereby fitting standard outside doors.

7. The device of claim 2 wherein said flange members are spaced 1⅜ inches (34.925 mm) apart thereby fitting standard inside doors.

8. The device of claim 2 wherein said flange members are spaced 1¾ inches (44.5 mm) apart thereby fitting standard outside doors.

9. The device of claim 1 wherein said web member has a thickness not exceeding about 1/16 inch (1.6 mm) thereby fitting between said door and said jamb.

10. The device of claim 2 wherein said web member has a thickness not exceeding about 1/16 inch (1.6 mm) thereby fitting between said door and said jamb.

11. The method of levelling a prehung door assembly comprising a hinged door, comprising the steps of:
    (A) fitting over the free edge of said hinged door a channel member comprising a web member, one flange member comprising a level indicator, and another opposing flange member free to fit between said hinged door and a stop for said door,
    (B) closing said hinged door with said channel attached thereto,
    (C) reading said indicator with said door closed, and
    (D) adjusting said door assembly to be level from edge to edge.

* * * * *